United States Patent [19]

Eller

[11] Patent Number: 5,045,216

[45] Date of Patent: Sep. 3, 1991

[54] METHOD, SYSTEM AND COLLECTING VESSEL FOR OIL SPILL RECOVERY

[76] Inventor: J. David Eller, P.O. Drawer "E", 33 NW. 2nd St., Deerfield Beach, Fla. 33441

[21] Appl. No.: 485,625

[22] Filed: Feb. 27, 1990

[51] Int. Cl.$^5$ .............................................. E02B 15/04
[52] U.S. Cl. ................................. 210/776; 210/242.3; 210/923; 114/270
[58] Field of Search .................... 210/242.3, 776, 923; 114/270; 440/39

[56] References Cited

U.S. PATENT DOCUMENTS

| 61,880 | 2/1867 | Serrell | 210/242.3 |
|---|---|---|---|
| 1,943,152 | 1/1934 | Weiss | 440/39 |
| 2,891,672 | 6/1959 | in't Veld | 210/923 |
| 3,139,060 | 6/1964 | Dane | 440/39 |
| 3,219,190 | 11/1965 | Thune | 114/147 |
| 3,251,330 | 5/1966 | Honegger | 210/242.3 |
| 3,529,720 | 9/1970 | Chablaix | 210/776 |
| 3,547,553 | 12/1970 | Stanfield | 210/242.3 |
| 3,618,768 | 11/1971 | Brown | 210/776 |
| 3,659,713 | 5/1972 | Mueller | 210/776 |
| 3,666,098 | 5/1972 | Garland et al. | 210/776 |
| 3,684,095 | 8/1972 | Ayers | 210/242.3 |
| 3,688,506 | 9/1972 | Marcocchio | 210/242.3 |
| 3,693,801 | 9/1972 | Pogonowski | 210/242.3 |
| 3,722,687 | 3/1973 | Stebbin et al. | 210/219 |
| 3,722,688 | 3/1973 | Wirsching | 210/776 |
| 3,730,346 | 5/1973 | Prewitt | 210/242.3 |
| 3,771,662 | 11/1973 | Muramatsu et al. | 210/923 |
| 3,823,828 | 7/1974 | Derzhavets et al. | 210/242.3 |
| 3,830,370 | 8/1974 | Glaeser et al. | 210/242.3 |
| 3,836,004 | 9/1974 | Favret | 210/776 |
| 3,844,944 | 10/1974 | Mercuri | 210/776 |
| 3,847,816 | 11/1974 | DiPerna | 210/242.3 |
| 3,907,463 | 9/1975 | Eller et al. | 417/360 |
| 3,970,556 | 7/1976 | Gore | 210/776 |
| 4,031,707 | 6/1977 | Ross et al. | 210/242.3 |
| 4,033,869 | 7/1977 | McGrew | 210/242.3 |
| 4,116,833 | 9/1978 | Stagemeyer et al. | 210/776 |
| 4,133,765 | 1/1979 | Stupica | 210/242.3 |
| 4,139,470 | 2/1979 | Stagemeyer et al. | 210/170 |
| 4,142,972 | 3/1979 | Nebeker et al. | 210/242.3 |
| 4,146,477 | 3/1979 | Challener | 210/143 |
| 4,182,679 | 1/1980 | Van Hekle | 210/923 |
| 4,208,978 | 6/1980 | Eller | 114/151 |
| 4,209,400 | 6/1980 | Mayes | 210/776 |
| 4,223,625 | 9/1980 | Puretic | 114/147 |
| 4,264,444 | 4/1981 | Bronner | 210/242.3 |
| 4,310,415 | 1/1982 | Webb | 210/242.3 |
| 4,350,476 | 9/1982 | Eller | 417/304 |
| 4,356,086 | 10/1982 | Oberg | 210/242.3 |
| 4,388,188 | 6/1983 | Morris | 210/242.3 |
| 4,510,054 | 4/1985 | Wylie | 210/242.3 |
| 4,669,972 | 6/1987 | Koblanski | 210/923 |
| 4,818,399 | 4/1989 | Midkiff | 210/242.3 |
| 4,851,133 | 7/1989 | Rymal | 210/242.3 |
| 4,882,073 | 11/1989 | Griffith | 210/776 |

FOREIGN PATENT DOCUMENTS 0005411 11/1979 European Pat. Off. .
2398845 3/1979 France .

Primary Examiner—Stanley Silverman
Assistant Examiner—Christopher Upton
Attorney, Agent, or Firm—Vorys, Sater, Seymour & Pease

[57] ABSTRACT

There are disclosed a method of and system including a ship for recovery of oil from an oil spill. The system includes a main ocean-going ship having a floating intake device with large submersible pumps; a clarifier system in the ship for separating the oil from the water; a discharge system for discharging the separated water; a bow thruster for laterally positioning the bow; a plurality of other vessels using floatable oil recovery booms for containing the spill and urging it toward the oil recovery ship, and pumps for pumping the processed oil back to shore or to another ship. A plurality of secondary and smaller vessels each having pumping means associated therewith. The smaller vessels can use booms to contain the spill and can have their pumping means operated so as to create controlled currents in preselected directions.

22 Claims, 4 Drawing Sheets

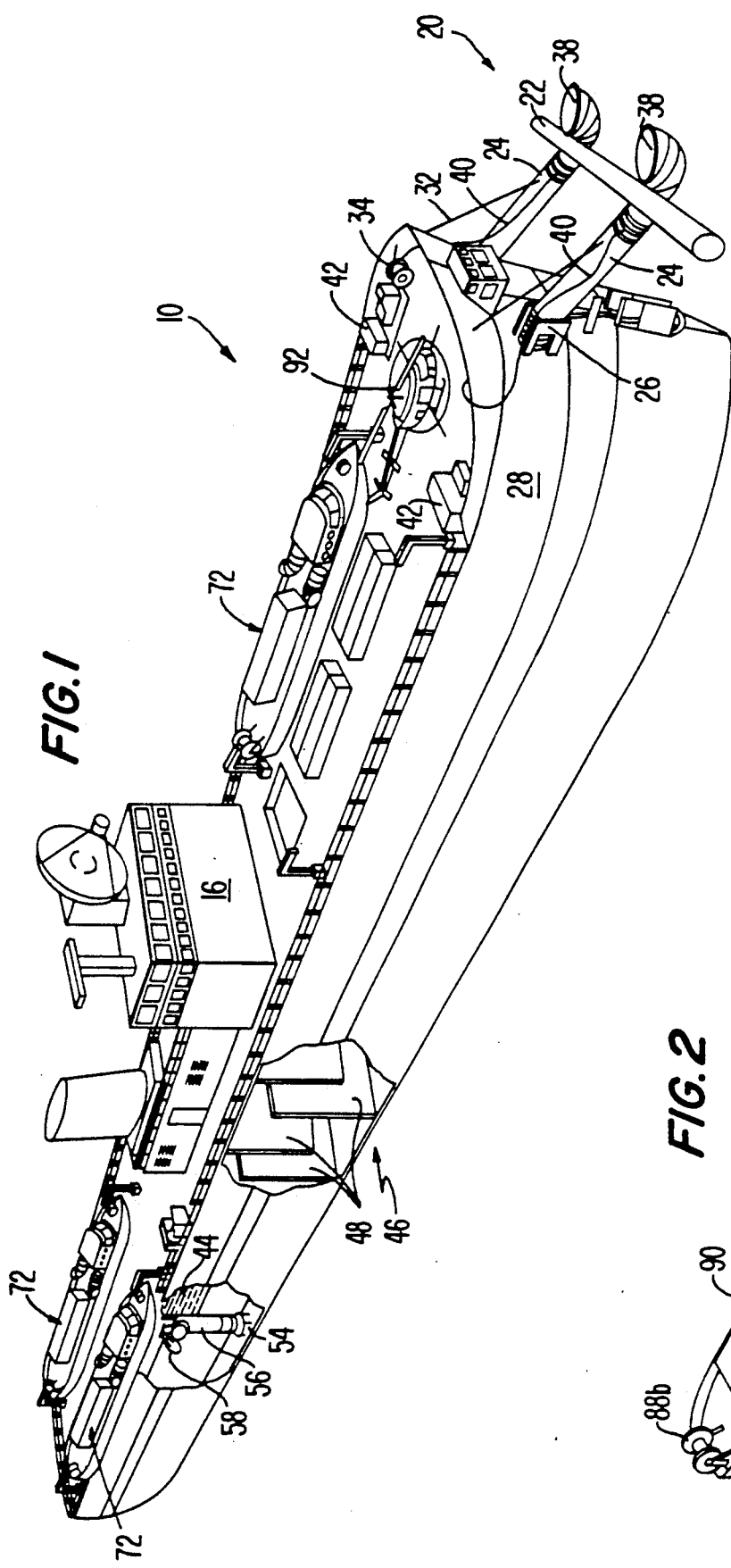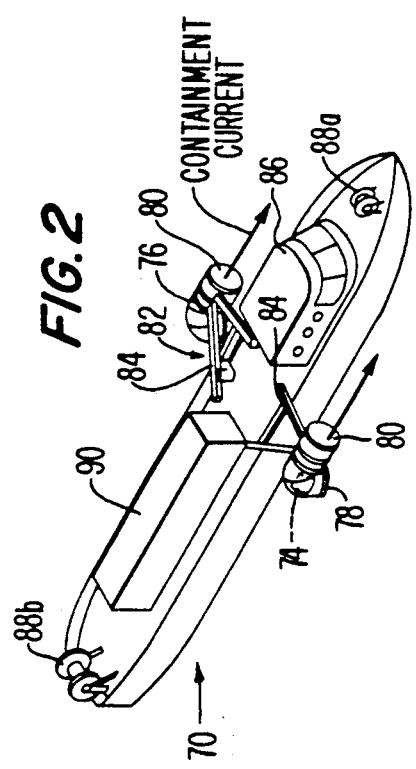

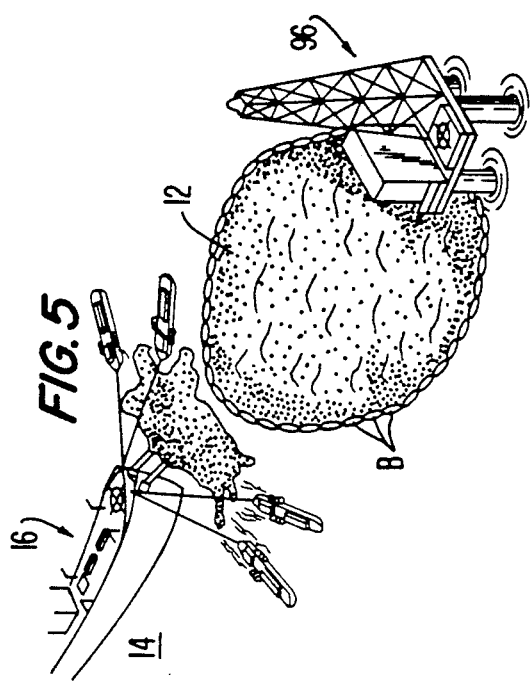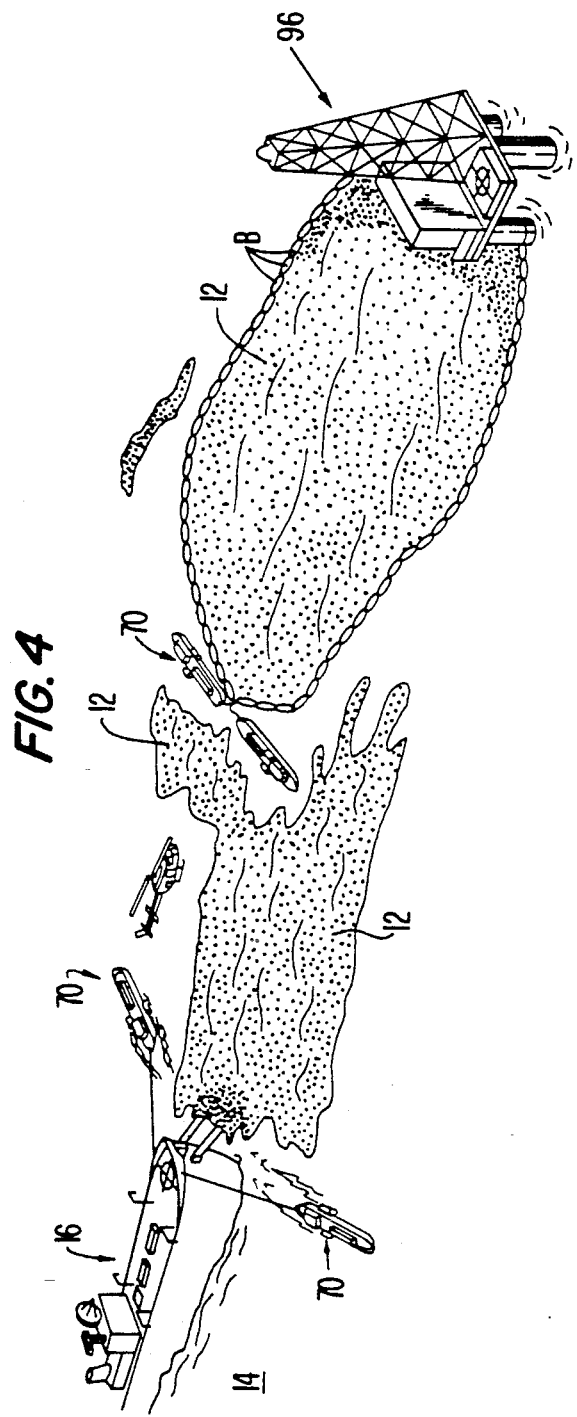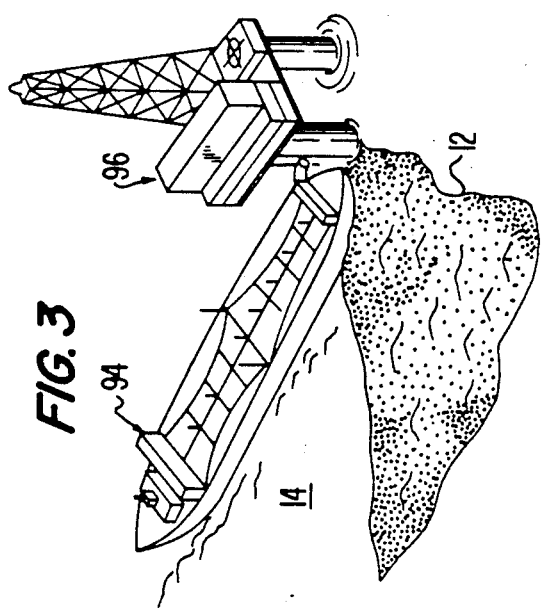

METHOD, SYSTEM AND COLLECTING VESSEL FOR OIL SPILL RECOVERY

CROSS REFERENCE TO RELATED APPLICATION

The present invention is related to applicant's co-pending application entitled "Method, System, Ship and Collecting Device for Oil Spill Recovery" having Ser. No. 07/431,395 and being filed on Nov. 3, 1989.

BACKGROUND OF THE INVENTION

The present invention is directed toward a method, system, and a plurality of vessels for use in controlling oil spill recovery.

With the larger oil tankers of today great quantities of thick black crude oil can be released into the water should the oil tanker experience an accident. Moreover, off-shore drilling platforms sometimes malfunction and this may result in the loss of oil. Accordingly, up to several million gallons of crude oil can spread over the water. Currents can carry the contaminating oil out to sea and to hundreds of miles of coastline. Oil spills can produce devastating damage to coastlines, fisheries and kill tens of thousands of animals.

Oil is not easy to clean up as can be evidenced by recent disasters. Moreover, it is important to start cleaning up a spill immediately before the oil has a chance to spread.

There have been numerous proposals to recover oil from a spill on the water. One approach is to use chemical dispersents which break down the oil into tiny pieces. However, there is a surface. They can be towed by ships to corral the pancake-like floating oil. Subsequently, skimmer devices then collect the oil by sucking or scooping it up.

Exemplary of other known prior art approaches include those described in the following U.S. Pat. Nos.: 3,251,330; 3,688,506; 3,684,095; 4,182,679; 3,693,801; 4,209,400; 3,730,346; 3,771,662; 4,223,625; 3,844,944; 4,356,086; 3,847,816; 4,146,477; 4,388,188; 4,116,833; 4,818,399; 3,722,688; 3,847,816; 4,139,470; 4,142,972; 4,356,086; 3,836,004; 4,388,188; 4,510,054 4,133,765; 4,669,972 and 3,970,556. As noted, an oil spill is subject to currents and sometimes the oil will move toward the open ocean which makes its recovery by known skimmer devices difficult because of wave action, particularly with rolling seas. In situations where there are several million gallons of spilled oil, the heretofore known devices used are inadequate. Unfortunately, present human efforts will generally get rid of about 10 percent of the oil from an oil spill.

A significant improvement over the prior art approaches is described in applicant's above noted patent application. Basically, these approaches disclose an improved method of and system including a surface vessel for expeditiously removing floating contaminant from the surface of a body of water. Accordingly, there is provided an improved arrangement whereby the contaminant collecting device is maintained in the skimming position of the intake during ship movement despite rolling seas. By virtue of the large capacity pumps utilized in the suction system vast quantities of oil/water are pumped to a separation reservoir within the body of the ship. As a result large quantities of oil may be rapidly and efficiently separated. Despite the significant advantages offered by the above noted invention, there is, nevertheless, a continuing desire to improve thereupon.

SUMMARY OF INVENTION

Accordingly, it is an object of the present invention to provide for an oil recovery method, system including a main vessel and several smaller vessels wherein oil spills may be easily and quickly contained and recovered.

In this regard, there is a system for recovering floating contaminant from the surface of a body of water. The system comprises a main surface vessel propellable on a body of water and includes a reservoir for receiving a contaminant/water mixture thereinto, and separation means operatively associated with the reservoir for separating the contaminant from the water. Provision is made for floatable water/contaminant collecting means connected to and movable with the main vessel and includes intake means being automatically maintainable in a position for allowing intake of a water/contaminant mixture thereinto and submersible pumping means associated with the intake means and being operable for pumping the water/contaminant mixture to the reservoir. Provision is made for discharge means being operable for at least pumping the separated water from the reservoir.

A plurality of secondary, self-propellable surface vessels are provided. Each of the secondary vessels includes submersible pumping means including an intake assembly and an outlet assembly connected to and movable with the secondary vessel. The pumping means is operable for pumping the water/contaminant mixture into the intake assembly and out from the outlet assembly to create a contained current of the water/contaminant mixture in a direction which is controlled by the position of the outlet assembly.

In an illustrated embodiment, smaller self-propellable vessels are positionable to drive the contaminant/water mixture to the intake assembly of the main vessel and are carriable and off-loadable from the main vessel.

In another illustrated embodiment, provision is made for interposing the smaller self-propellable vessels between the shoreline and a spill front so as to push or sweep the oil from the shore and toward the main vessel. The smaller vessels are anchored between the shore line and the spill and serve to effectively sweep the spill toward the larger vessel.

In another illustrated embodiment, provision is made for a string of floatable oil contaminant booms which are connected to at least a pair of the secondary vessels so as to contain the spill as well as urge it toward the main vessel.

In another illustrated embodiment, provision is made for a helicopter having sensing means for sensing the thickest parts of a slick so that the secondary vessels can direct their efforts to such locations.

The present invention also contemplates a method of removing contaminant material from the surface of a body of water. The method includes the step of providing a main contaminant recovery vessel propellable along a body of water and having a reservoir; the step of positioning a contaminant collecting device forwardly of the vessel for skimming through the surface contaminant as the vessel moves; the step of providing the collecting device with intake means that extend from the vessel to the surface and which has an intake opening formed at a distal end thereof with at least a submersible pumping device positioned therein; the step of maintaining skimming positioning of the intake means despite wave motion; the step of pumping the water/contaminant mixture to the reservoir by the submersible pumping device; the step of separating the contaminant from the water; the step of discharging at least the separated water from the reservoir so as to provide for a generally continuous separating process; the step of providing a plurality of smaller secondary and self-propellable vessels which have water/contaminant pumping means associated therewith; and, the step of operating the pumping means of the secondary vessels so as to generate a desired surface flow of contaminant/water mixture toward the collecting device of the main vessel.

In another illustrated embodiment, there is a method of controlling floating contaminant comprising the step of providing at least one self-propellable surface vessel having at least one submersible pumping means associated therewith; and, the step of operating the pumping means to generate a reverse surface flow of the mixture so as to urge the mixture in a desired direction.

According to this invention, there is provided a self-propellable vessel for use in directing a contained current of a water/contaminant mixture comprising the vessel includes a vessel body and pumping means connected to the vessel body. The pumping means have water/contaminant intake and outlet means and a submersible pump which is operable to create a contained current of the mixture in a preselected direction.

In an illustrated embodiment, the vessels of the last-noted means has the intake means and the pump submerged and the outlet means above the water surface. Also, the pumping means include mounting means for mounting the pump means exteriorly of the vessel body for movement between operative and inoperative positions.

Among the other objects and features of the present invention are the provision of an improved contaminant recovery system for use in removing contaminant from the surface of a body of water; the provision of an improved system of the foregoing type which includes a main ship which utilizes submersible pumps for withdrawing large quantities of fluid and contaminant into a reservoir aboard a vessel and a plurality of smaller vessels, each equipped with submersible pumps; the provision of an improved system of the foregoing type in which the submersible pumps on the smaller vessels arranged are to provide controlled currents of the contaminant so as to direct the contaminant toward the main vessel; the provision of an improved system of the foregoing type in which the smaller vessels are interposed between the shoreline and an advancing front of the spill; the provision of an improved system in which the smaller vessels use floating booms for surrounding, collecting and urging the surface contaminant toward the main vessel; the provision of an improved system of the foregoing type which utilizes a helicopter with sensors that detect the thickest parts of the slick; and the provision of improved smaller vessels for use in achieving the foregoing.

Still other objects and further scope of applicability of the present invention will become apparent from the detailed description to follow when taken in conjunction with the accompanying drawings in which like reference numerals indicate like structure throughout the several views.

BRIEF DESCRIPTION OF THE DRAWINGS

FIG. 1 is a perspective view of one preferred embodiment of the present invention, partly in section, showing details of the invention;

FIG. 2 is a perspective view showing of a smaller vessel of the present invention;

FIG. 3 is a perspective view of the scene of an accident resulting in an oil spill;

FIG. 4 is a perspective view illustrating one step of a spill recovery operation of the present invention;

FIG. 5 is a perspective view illustrating another step of a spill recovery operation of the present invention;

DETAILED DESCRIPTION

Figure 6:
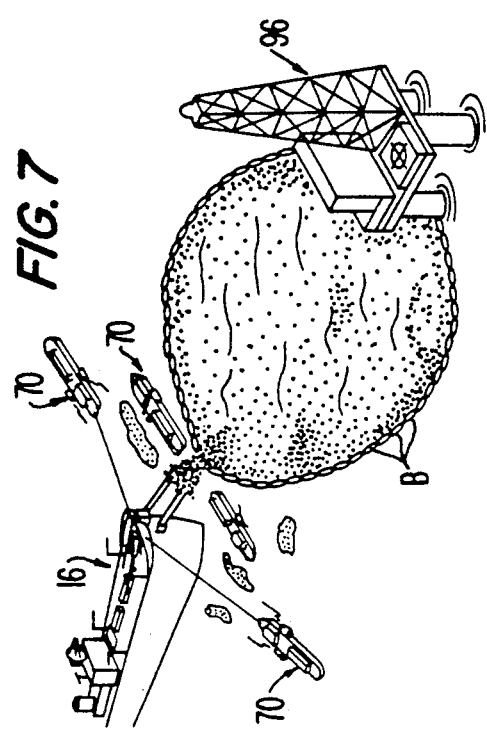
FIG. 6 is a perspective view illustrating still another step of a spill recovery operation of the present invention.
Figure 7:
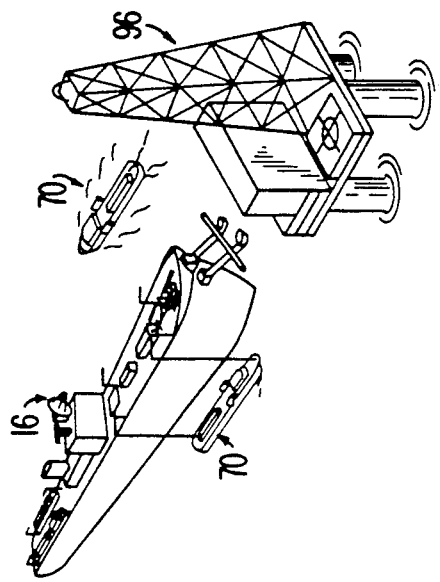
FIG. 7 is a perspective view illustrating still another step of the present invention.

Reference is made to FIGS. 1-9 for illustrating an improved system 10 for recovering a spill of surface contaminants, such as crude oil 12 from the surface of a body of water 14. Included in the system 10 is a self-propelled surface vessel, such as an ocean-going ship 16. Although a self-propelled ship is shown in this embodiment, it will be appreciated that a barge or the like may be used in the recovery process to be described. Only those details of the ship 16 necessary for understanding this invention will be discussed. A more complete description of the ship 16 is made in copending patent application U.S. Ser. No. 07/431,395 filed Nov. 3, 1989 which description is incorporated herein by reference. Connected to the bow of the ship is a portable bow thruster 18 of the type described in U.S. Pat. No. 4,208,978 and its description is incorporated herein by reference. The bow thruster 18 is essentially operable for purposes of laterally positioning the bow of the ship 16 in a manner which will facilitate maneuverability relative to the spill and oil lines coupled to the ship. The bow thruster 18 is retractable to a position above the water line when not in use. In use, the bow thruster is placed in the water and is operated so that water can be selectively thrust from opposite ends to shift the bow in the opposite direction of the thrusts.

Forwardly of the bow, there is provided a floatable oil/water collecting means or assembly 20. The floatable collecting assembly 20 includes an elongated floating means or cylindrical pontoon 22 that is connected to a pair of rigid and corrosion-resistant oil/water intake pipes 24 extending forwardly from the bow. The pontoon 22 can have, for example, a 60 inch diameter and be connected to the intake pipes 24 by reason of known flexible connectors (not shown). Each of the inward ends of the intake pipes 24 is pivotally mounted to a corresponding mounting bracket 26 attached to the ship's bulwark 28 for allowing the pipes to move in vertical planes for reasons which will be discussed. The pivotal intake pipes 24 are fluidly coupled to suitable inboard fluid conduits (not shown) by flexible bellows-type coupling members 30. The pivotal and flexible connection of the intake pipes 24 allows the collecting assembly 20 to continue floating and efficiently removing oil from the surface while the ship is moving despite wave action, especially rolling seas. Consequently, the intake pipes 24 will be automatically raised and lowered in response to wave action and also to settling of the ship owing to the large volumes of oil/water taken into the ship during the separation process. A cable 32 is attached to each intake pipe 24 and can raise and lower them due to the operation of a cable winch 34 so that, for example, the entire collecting assembly can be elevated out of the water.

Disposed within each of the intake pipes 24 in a known manner, is a submersible, variable volume water pump unit, indicated generally by reference numeral 36. The pump is described in U.S. Pat. No. 3,907,463 and its description is incorporated herein by reference. The pumps 36 are patented and obtainable from the M&W Pump Corporation, and are identified as the Model HMF 60 Water Pump. The submersible pumps 36 shown are a mixed flow type, but can also be an axial flow pump which can be mounted in the intake pipe 24 in a known manner. The output of each pump can be varied and can pump upwards of about 125,000 gpm of the oil/water mixture into the ship 16. Each of the pumps 36 has an inverted intake bell 38 which is attached to the free end of the intake pipe 24. The intake bells 38 are supported by the pontoon 22 so as to allow the former to skim vast volumes of the oil/water mixture from the surface of the water. The intake bells 38 can be located slightly below the oil spill 12. Each of the water pumps 36 is operable through hydraulic lines 40 from a drive unit 42 mounted onboard the ship 16. The drive units 42 of the pumps 36 are described in U.S. Pat. No. 4,350,476 which is herein incorporated by reference. The drive unit 42 is a patented product of the M&W Pump Corporation and is identified as the Model 6000D Drive Unit. It will be appreciated that the vertical positioning of the intake bells 38 will vary depending upon sea conditions as well as loading factors of the ship. The skimming position is maintainable automatically because of the floating collecting assembly 20. Since the intake bells 38 are below the oil spill 12 and the pumping capacities are so large, a hydraulic gradient is created which is sufficient to cause the flow into the intake pipes as the ship 14 moves and thereby avoids the oil/water from being pushed from the ship.

Referring back to the ship 16, it includes an extremely large hold or reservoir 44 which extends a substantial amount of the length of the ship. The reservoir 44 must have a large storage volume inasmuch as the pumps 36 can each pump large variable capacities up to 125,000 gpm into the ship. Mounted in the reservoir 44 is a clarification system 46 including a plurality of oil separating plates 48 which are suitably secured to a hold formed by the ship's bulwark. The separation plates 48 are spaced apart in a linear fashion and are vertically staggered relative to each other as shown. The foregoing arrangement serves to separate the water from the crude oil and the separated oil is stored downstream of the plates 48 in the reservoir 44. The present invention contemplates other oil/water separating approaches including a centrifuge type device.

Also according to this invention it is important that there be provided a processed water discharge means or assembly 50 so that the weight of the ship with the pumped water during the recovery process does not overload the ship. Since it is desired to allow the ship 16 to recover the oil as quickly and continuously as possible, the present embodiment utilizes a pair of large variable volume submersible pumps 52 (one of which is shown). These pumps are similar and equal in capacity to the pumps 36 described in connection with the collecting assembly 20. Accordingly, the processed water can be discharged at the same rate it is pumped into the ship. The pumps 52 are vertically oriented so that their intake ends 54 will be adjacent the bottom hold of the ship 16 so as to pump the "cleaned" or separated water. The pump outlet 56, of each is fitted with a flap gate valve 58. The ship's bulwark has suitable fittings and ports for permitting discharge of the pumped fluid from the gate valve back to the ocean. Each of the pumps 52 is also operated by a drive unit 42 and is connected thereto by suitable hydraulic lines 40, 40'. Accordingly, large quantities of clean processed water are returned through the gate valve to the body of water 14 while the separated oil 12 is retained in the reservoir 44 for subsequent removal from the ship 16. With the above noted system 10 operating, up to 250,000 gpm can be pumped into and out of the ship 16 with the four pumps operating simultaneously at maximum capacity. The present invention embraces within its scope the use of variable volume pumps having capacities exceeding those noted above for the pumps 36 and 52. Consequently, the configuration of the ship should be such as to be long enough to allow oil/water separation time through the length, and hold several million pounds of the oil/water mixture at any given time.

Other submersible type pumps (not shown) comparably driven, such as the type noted above are operable to pump the separated oil from the reservoir 44 through suitable fittings (not shown) to tender vessels or to shore facilities. These pumps can operate independently or simultaneously with the pumps.

Preferably provided at the bow of the ship 16 is a control cabin 60. The control cabin 60 is provided with a control unit (not shown) wherein an operator can adjust the horizontal and vertical positioning of the collecting assembly 20 by operating the winches as necessary and bow thruster 18 to laterally position the ship 16; and operate the speed of pumps to vary their outputs. It is clear that the collecting assembly 20 could be raised should it be desired to have the ship proceed to another location at a fast rate of speed. Additionally, the invention contemplates having a plurality of tender ships with suitable equipment which can off-load the collected oil being discharged by the pumps.

Reference is made to FIG. 2 for showing an improved self-propelled contaminant current containing and sweeping vessel 70 which is used in conjunction with the recovery ship 16.

The smaller contaminant current containing and sweeping vessels 70 are, preferably, used in conjunction with a string of known buoyant booms B or netting to corral and contain the spill 12 as well as for making or producing a containment current that is useful for creating a sweeping flow of the water/oil mixture toward the collecting assembly 20 of the ship 16. Preferably, the current making and sweeping vessels 70 are high speed vessels which can travel at speeds of 40-50 knots per hour or more and which can be carried by and off-loaded from the main ship 16. For providing the containment currents of the oil/water mixture, each vessel 70 is provided with a pair of submersible pumping systems 72. Each system 72 contains a submersible pump 74, such as like pump 36 described above. As noted earlier, this type of submersible pump is obtainable from the M&W Pump Corporation and is known as M&W Model HAC-3600. This particular model can pump upto 125,000 gpm. Of course, the invention contemplates even larger capacities. The pump 74 is mounted in a conduit 76 having an elbow shape with an intake end 78 that is submersible in the water 14, and an outlet end 80 through which the pumped oil/water mixture exits, as indicated by the arrows, with sufficient force as to drive the exiting current to the collecting assembly 20. It is envisioned that the pump capacity of each pump 74 can range up to 125,000 gpm or more.

Each of the pumping systems 72 further include a mounting structure 82, whereby the conduits 76 can be pivotally raised and lowered between the operative positions shown in FIG. 2 and the inoperative positions shown in FIG. 1. In this embodiment, the mounting structure 82 includes a pivotal truss arrangement 84 which is movable, by appropriate means (not shown), to a horizontal position, whereby the inlet end 78 is submerged below the waterline sufficiently to allow the submersible pump 74 to operate in the manner intended. When the truss assembly 84 is raised to a vertical position (not shown) the pumping conduit 76 is raised from the water and retracted away to the vessels' sides for storage; such as shown in FIG. 1. While the foregoing mounting structure 82 is illustrated, it is well within the spirit and scope of the present invention to have other suitable devices which can be used to raise and lower the pumping system 72 between its operative and inoperative positions. While a pair of submersible pumping systems 72 are shown it will be appreciated that a single pumping arrangement can be utilized as well. It will be appreciated that an operator in the cabin 86 of the vessel 70 can operate the submersible pumping systems 72 to achieve the desired results. Also, attached to the vessel is a pair of bow and stern winches 88a and 88b; respectively shown in FIG. 2. The winch 88a can be used for operating a cable having a heavy duty grappling hook that secures the vessel 70 to the main ship 16; such as shown in FIGS. 3-5. The stern winches 88b, which are larger, can be used for purposes of laying and pulling ends of a string of floatable booms B or net or screening in the ocean, whereby the booms B can be maneuvered in such a manner as to collect and contain the oil spill 12.

The contaminant current vessels 70 are provided with a storage area 90, for example, 40 feet in length, and which can hold the required amount of netting or booms and buoys for the containment and sweeping processes.

In addition, the present invention contemplates the utilization of an aircraft, such as a helicopter 92, which is associated with the main ship 16. The helicopter 92 can utilize a electronics scanning type detecting device (not shown) which is known in this field for purposes of detecting the thickest part of a oil slick. With such useful information, the containment current making and sweeping vessels 70 can be deployed to areas of an oil slick which are the thickest.

Reference is now made to FIGS. 3-9 for describing a preferred mode of cleaning an oil spill. As shown in FIG. 3, a hypothetical worse case scenario is depicted in which an oil tanker 94 hits an oil production platform 96 and an oil spill 12 starts contaminating the surrounding water 14 It is contemplated by the present invention that the main ship 16 and the current making and sweeping vessels 70 proceed toward the spill. It is envisioned that the current making and sweeping vessels 70 can rush to the spill at speeds, for example, of 40-50 knots. As shown in FIG. 4, two of the current making and sweeping vessels 70 can secure and position the retaining booms B about the spill 12. Another pair of containment current making producing vessels 70 are connected by tie-back cables 98 to the main vessel 16. The submersible pumping system 72 can operate to produce or make containment currents, with their pumps operating, so as to push or sweep the oil/water mixture towards the collecting assembly 20 or towards the oil spill area having the highest concentration of the oil. These high oil concentration areas are determined by the helicopter 92 relying on its electronic scanning device.

Figure 8:
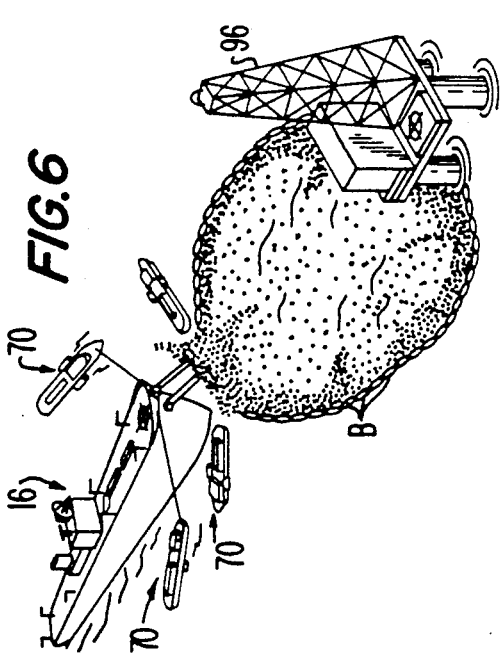
FIGS. 8 and 9 illustrate still further steps in an oil spill recovery operation of the present invention.
Figure 9:
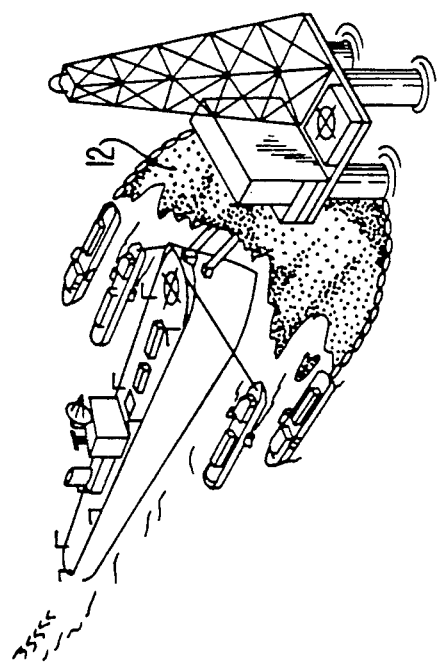

FIG. 5 shows that the booms B surround the oil spill 12 after being appropriately tied off and supported by appropriate buoys (not shown). Thereafter, the other current making and sweeping vessels 70 are utilized with their pumps operating so as to direct the containment current toward the collecting assembly 20 so that a greater percentage of the oil spill can be effectively skimmed. As shown in FIG. 6, once the residual oil surrounding the containment area has been effectively reduced, a pair of the current making and sweeping vessels 70 start pulling the booms apart while the remaining two current making and sweeping vessels continue to position themselves alongside the main ship 16 to pump any excess oil back towards the collecting assembly 20. Once the containment booms are pulled apart, the main ship 16 with the skimmers enter the main area of the contained oil spill 12. It will be understood that as the booms B are being pulled apart further by two vessels 70, the remaining vessels 70 pump excess oil towards the collecting assembly 20. FIG. 8 illustrates that two of the current making and sweeping vessels 70 still effectively contain the oil spill while the main ship nearly completes the clean-up operation. FIG. 9 depicts the vessels 70 being loaded aboard the main ship 16. It is also contemplated by the present invention that the current vessels 70 can proceed to leave a clean net (not shown) at the site for purposes of catching any small portions of oil which may subsequently leak.

Figure 10:
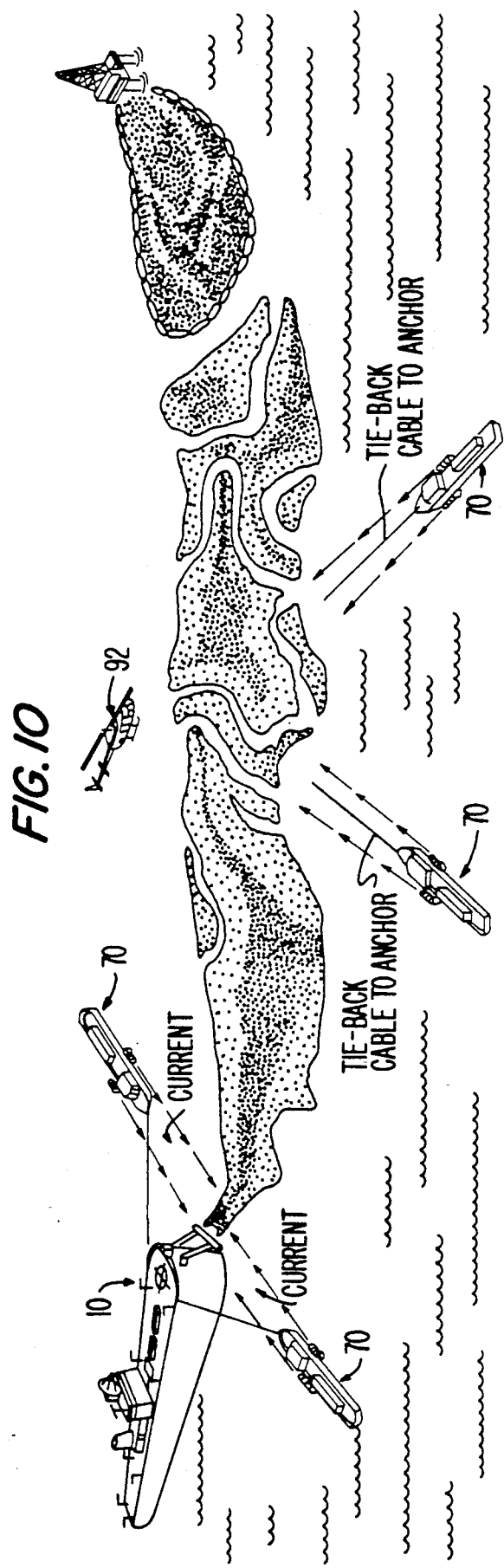
FIG. 10 is a view illustrating another embodiment of the present invention.

FIG. 10 shows another preferred embodiment of the present invention in which a plurality of current making and sweeping vessels 70 are utilized to sweep or push the oil away from the shoreline and towards the main vessel 16. In this embodiment, an anchor (not shown) is dropped and tie back cables 98 are connected thereto for securing the vessels 70. The vessels 70 can maneuver about the water and sweep or push the leading front of a spill away from the shoreline. It is contemplated that the vessels 70 could have their engines operated with sufficient thrust to offset the reverse thrust provided by the pumping systems.

It will be appreciated that the foregoing procedure is an economical and highly efficient approach for containing and recovering substantial portions of oil in an oil spill. Although this embodiment discloses the procedure in conjunction with an oil production platform, it will be appreciated that the same procedure can be used with leaking ocean vessels.

According to the present invention it will be recognized that certain changes may be made in the above-described construction and method without departing from the scope of the present invention herein involved. It is intended that all matter contained in this description and shown in the accompanying drawings shall be interpreted as illustrative and not in any limiting sense.

What is claimed is:

1. A system for recovering floating contaminant from the surface of a body of water, said system comprising:
   a main surface vessel propellable on a body of water, said vessel defining reservoir means for receiving the contaminant and water introduced thereinto and separation means operatively associated with said reservoir means for separating the contaminant from the water;
   floatable water/contaminant collecting means connected to and movable with said vessel and including intake means being automatically maintainable in a position for allowing intake of a water/contaminant mixture thereinto and submersible pumping means associated with said intake means and being operable for pumping the water/contaminant mixture to said reservoir means;
   discharge means being operable for at least pumping the separated water from said reservoir means;
   a plurality of secondary, self-propellable surface vessels carriable by said main vessel and off loadable from the main vessel; and,
   each of said secondary vessels including submersible pumping means including an intake assembly and an outlet assembly connected to and movable with said secondary vessel, said pumping means being operable for pumping the water/contaminant mixture into said intake assembly and out from said outlet assembly to create a reverse flow of the water/contaminant mixture in a direction which is controlled by the position of said outlet assembly.

2. The system of claim 1 wherein said self-propellable vessels are operable to drive the contaminant/water mixture to said intake assembly of said main vessel.

3. The system of claim 2 wherein each of said secondary vessels is provided with a pair of said pumping means, each one being provided on a side thereof.

4. The system of claim 3 wherein said submersible pumping means has a pumping capacity upto at least 125,000 gpm or more.

5. The system of claim 1 further including a plurality of said secondary vessels, each having a floatable oil spill containment device connected thereto, said secondary vessels being operable to move respective ones of said containant devices to collect and contain the oil spill and urge the oil spill to said intake means.

6. The system of claim 5 further wherein said device includes a string of floatable booms which are connected to at least a pair of said secondary vessels and can contain the spill as well as urge it toward said main ship.

7. The system of claim 1 further including a helicopter having sensing means for sensing locations with the thickest part of a slick so that said secondary vessels can direct their effort to such locations.

8. The system of claim 1 wherein said inlet assembly is submersible and said outlet is positioned above the water surface.

9. A method of removing contaminant material from the surface of a body of water comprising the steps of:
   providing a main contaminant recovery vessel propellable along a body of water and having a reservoir;
   positioning a contaminant collecting device forwardly of the vessel for skimming through the surface contaminant as the vessel moves;
   providing the collecting device with intake means that extend from the vessel to the surface and which has an intake opening formed at a distal end thereof with at least a submersible pumping device positioned therein;
   maintaining skimming positioning of the intake means despite wave motion;
   pumping the water/contaminant mixture to the reservoir by the submersible pumping device;
   separating the contaminant from the water;
   discharging at least the separated water from the reservoir so as to provide for a generally continuous separating process;
   providing a plurality of smaller secondary and self-propellable vessels which have water/contaminant pumping means associated therewith;
   operating the pumping means of the secondary vessels so as to generate a desired surface flow of contaminant/water mixture toward the collecting device of the main vessel.

10. The method of claim 9 further including the preliminary step of providing a collection and channeling means afloat in the water and being movable by said secondary vessels so as to contain at least a portion of a oil spill and subsequently urge the contained oil to the intake means.

11. The method of claim 10 including a step of utilizing a helicopter and sensing device to determine the thickest part of an oil slick.

12. A method of controlling floating contaminant comprising the steps of:
   providing at least one self-propellable surface vessel having at least one submersible pumping means associated therewith, the pumping means having inlet and outlet means, the inlet means is submerged and the outlet means being adjacent the contaminant surface;
   operating the pumping means to generate a surface flow of the contaminant adjacent the outlet means so as to urge the surface contaminant in a desired direction which is controlled by the position of the outlet means and which direction is away from the vessel.

13. The method of claim 12 comprising the steps of providing a plurality of said self-propellable vessel; utilizing said plurality of vessels to pump or sweep the floating contaminant of a desired direction.

14. The method of claim 12 wherein a plurality of vessels are anchored intermediate an area to be protected and the surface contaminant and the plurality of vessels are operated so as to sweep the surface contaminant away from the area to be protected.

15. A self-propellable vessel for use in directing a current of a water/contaminant mixture in a preselected direction comprising:
   a vessel body;
   pumping means connected to said vessel body and having water/contaminant intake and outlet means; said intake means being submerged and said outlet means being adjacent the contaminant surface; said pumping means including at least a submersible pump which is operable to create a contained surface flow current of the water/contaminant mixture in the preselected direction which is controlled by the position of said outlet means and which direction is away from said vessel body.

16. The vessel of claim 15 wherein said pumping means include mounting means for mounting said pump means exteriorly of said vessel and body.

17. The vessel of claim 16 wherein said pump mounting means allows said pumping means to move between an operative position in the water to an inoperative on said vessel body.

18. The vessel of claim 15 wherein said pumping means includes an elbow shaped conduit defining at opposite ends thereof said inlet and said outlet means.

19. The vessel of claim 15 wherein there is provided another pumping means having intake and outlet means which another pumping means is provided with a submersible pump.

20. The vessel of claim 19 wherein each of said submersible pumps has a capacity of upto 125,000 gpm or more.

21. The vessel of claim 19 further including at least a pair of winches and a storage area for floatable booms or oil containing nets.

22. A method of removing contaminant material from the surface of a body of water comprising the steps of:
providing a main contaminant recovery vessel propellable along a body of water and having a reservoir;
positioning a contaminant collecting device forwardly of the vessel for skimming through the surface contaminant as the vessel moves;
providing the collecting device with intake means that extend from the vessel to the surface and which has an intake opening formed at a distal end thereof with at least a submersible pumping device positioned therein;
maintaining skimming positioning of the intake means despite wave motion;
pumping the water/contaminant mixture to the reservoir by the submersible pumping device;
separating the contaminant from the water;
discharging at least the separated water from the reservoir so as to provide for a generally continuous separating process;
providing a plurality of smaller secondary and self-propellable vessels which have water/contaminant pumping means associated therewith;
operating the pumping means of the secondary vessels so as to generate a desired surface flow of contaminant/water mixture toward the collecting device of the main vessel;
providing a collection and channeling means afloat in the water and being movable by the secondary vessels so as to contain at least a portion of a oil spill; and,
subsequently opening the contained oil spill by pulling at ends of the collection means to allow the intake means of the main vessel to enter as other secondary vessels operate to direct oil of the slick toward the intake means.

* * * * *